April 17, 1951    J. P. BEAIRD    2,548,934
CLOSURE DEVICE
Filed Jan. 12, 1946

INVENTOR.
J. P. BEAIRD
BY
F. M. McKnight
ATTORNEY

Patented Apr. 17, 1951

2,548,934

UNITED STATES PATENT OFFICE 2,548,934

CLOSURE DEVICE

James Patrick Beaird, Shreveport, La., assignor to J. B. Beaird Company, Inc., Shreveport, La., a corporation of Delaware Application January 12, 1946, Serial No. 640,966

1 Claim. (Cl. 220—61)

This invention relates to improvements in closure devices and more particularly, but not by way of limitation, to a closure device which is more or less permanent until such time it may become necessary to repair or recondition the vessel with which it is utilized.

The improved closure device of this invention contemplates adaption with valves and connecting flanges therefor, manhole closures on large or small pressure vessels and tanks, pipe end closures, pipe connections and heat exchangers.

It is an important object of this invention to provide an improved closure device which includes a split-ring clamping member for encircling the closure member whereby the clamping forces are distributed uniformly around the periphery of the closure member.

And still a further object of this invention is to provide a split-ring closure device for covers of pressure vessels which will provide a tighter seal or joint with any increase in temperature or pressure in the pressure vessel.

And another object of this invention is to provide an improved closure member adapted for use with pressure vessels, and of such construction that the sealing gasket utilized therein is maintained in position at all times thereby providing an evenly distributed gasket pressure.

And still another object of this invention is to provide a closure construction of the character set forth supra which includes a split-ring clamping member for encircling the closure member and thereby clamping the entire outer periphery of the closure member to the vessel with a lesser number of bolts, to provide correspondingly fewer adjustments and easier assembly of the closure device.

And still an additional object of this invention is provided a split-ring closure device adapted to be utilized with the cover member of a pressure vessel or the like which is simple in construction, easy to assemble and adjust, durable and efficient in its operation.

Other objects and advantages of this invention will be apparent from a study of the following specifications read in conjunction with the accompanying drawings wherein, Fig. 1 is a plan view of the improved closure device.

Figure 2:
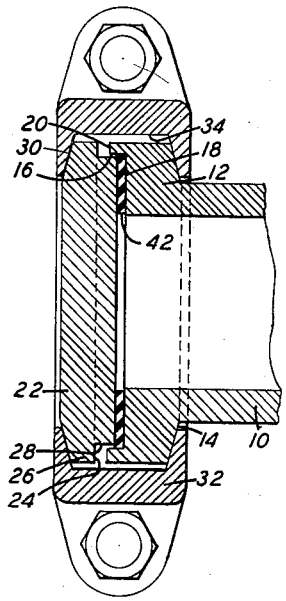
Fig. 2 is a vertical sectional view taken on lines 2—2 of Fig. 1.
Figure 1:
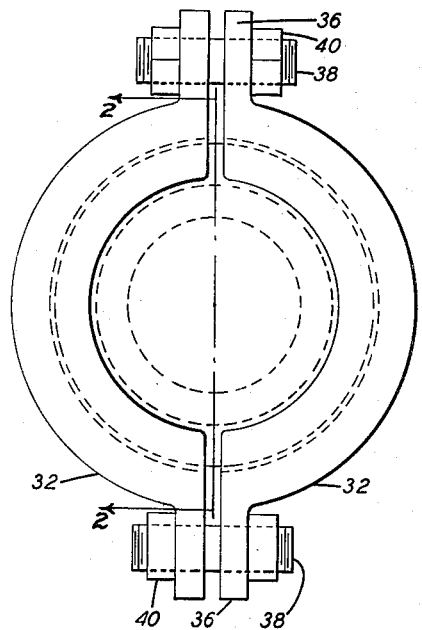

Referring now to the drawings in detail, reference character 10 designates the body of a pressure vessel such as a valve body, heat exchanger, tank or the like, and is preferably constructed with an outwardly projecting circumferential flange 12. The flange 12 has one face thereof formed with a taper 14 for a purpose that will be hereinafter set forth. The opposite face of the flange is cut away at 16 to provide a groove 18 providing a projection 20 for a purpose that will be hereinafter set forth. A circular cover plate or similar closure member 22 is adapted to close the open end of the body 10, and the outer periphery of the plate 22 is provided with a cut away portion 24 forming a projection 26 and a groove 28 complementary to the groove 18 and projection 20 of the flange 12. The outer face of the plate 22 adjacent the outer periphery thereof is tapered at 30 in a manner similar to the taper 14 on the projection 12 but in an opposite direction.

A pair of substantially semi-circular rings 32 are adapted to encircle the plate 22 and flange 12, and each of the rings are provided with a tapered recess 34 complementary to the tapers 14 and 30 on the flange 12 and cover plate 22. Each end of the semi-circular rings are provided with an outwardly disposed apertured projection 36 for receiving a threaded stud 38 and clamping bolt 40.

A gasket 42 is disposed in the groove 18 of the flange 12 when in an assembled relation with the closure plate 22. It will be apparent that the projection 20 of flange 12 cooperating with the projection 26 of the plate 22 act as a retaining lip for the gasket, thereby eliminating the possibility of a blow-out of the gasket due to high pressures that may be present in the vessel 10. The tapered groove construction of the split-rings 32 cooperating with the tapers 14 and 30 of the flange 12 and plate 22 effect a uniform distribution of the clamping forces about the periphery of the closure members whereby a tighter joint is provided at all times. Assembly of the bolts 38 will move the ring halves toward each other in order to wedge the closure cover 22 and the body 10 together, at the same time providing the retaining lip 20 to hold the gasket in position and provide an evenly distributed gasket pressure. Furthermore, the semi-circular rings 32 serve to clamp substantially the entire outer periphery of the closure members with a minimum of bolts and nuts for assembly, but which may be readily adjustable to increase the clamping pressure.

Figure 3:
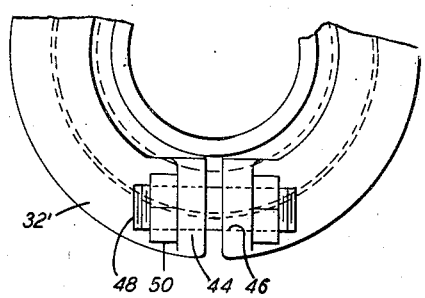
Fig. 3 is a detailed view showing a modified arrangement of the bolts connecting the device.
Figure 4:
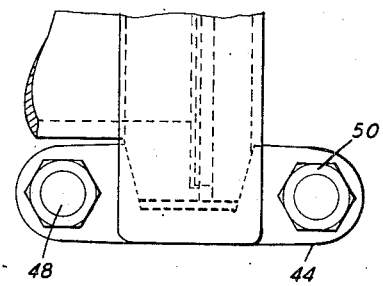
Fig. 4 is a detailed plan view of the modification shown in Fig. 3.

In Figs. 3 and 4 is shown an alternate or modified arrangement of the securing bolts, wherein the semi-circular rings 32 are provided at their end portions with upstanding projections 44 disposed within the outer periphery of the semicircular rings. The projections have apertures 46, and in assembly the projections 44 and apertures are in alignment to receive threaded studs 48 and clamping nuts 50. This arrangement of the clamping bolts on the face of the ring halves is advantageous under certain conditions where it is desired to decrease the over-all diameter of the closure member for a pressure vessel.

From the foregoing it will be apparent that the ring closure device is adaptable to pressure vessels or containers of variable diameters, either large or small, and will effect a tight sealing joint to substantially eliminate leakage regardless of an increase of temperature or pressure within the vessel. The ring closure may operate on an open end of the vessel or can be utilized with interlocking bodies such as valves. Furthermore, the construction of the gasket retaining lip maintains an even-distributed gasket pressure to prevent blow-outs and the consequent repair of the gasket and closure device.

Changes may be made in the details of the invention disclosed herein, without departing from the spirit of the invention, as expressed in the following claim.

I claim:

A closure device for a high pressure container comprising a cover plate therefor, said container and plate having confronting annular flanges provided with opposed tapered side faces and cylindrical outer faces, a pair of semi-circular rings having a recess with tapered side portions and a cylindrical portion interconnecting the tapered side portions adapted to peripherally fit the corresponding faces of the annular flanges, a recess in the container flange providing a projecting lip, a recess in the cover plate cooperating with the projecting lip, a gasket disposed in the first mentioned recess and upstanding projections disposed within the confines of the outer periphery of the rings, clamping means cooperating with the projections for clamping the annular flanges together to effect a uniform fit.

JAMES PATRICK BEAIRD.

REFERENCES CITED

The following references are of record in the file of this patent:

UNITED STATES PATENTS

| Number | Name | Date |
|---|---|---|
| 643,908 | Meyer | Feb. 20, 1900 |
| 669,673 | Overbeck | Mar. 12, 1901 |
| 858,463 | Matchette et al. | July 2, 1907 |
| 1,571,343 | Register | Feb. 2, 1926 |
| 2,049,847 | Lockhart | Aug. 4, 1936 |
| 2,115,361 | Daggett | Apr. 26, 1938 |
| 2,441,131 | Blackman | May 11, 1948 |